June 5, 1923.

W. COHEN 1,457,300

COIN CONTROLLED DISPENSING APPARATUS

Filed June 11, 1921    4 Sheets-Sheet 1

Inventor
Wolfe Cohen
By Lancaster and Allwine
Attorney

Inventor
Wolfe Cohen

Patented June 5, 1923.

1,457,300

UNITED STATES PATENT OFFICE.

WOLFE COHEN, OF REVERE, MASSACHUSETTS.

COIN-CONTROLLED DISPENSING APPARATUS.

Application filed June 11, 1921. Serial No. 476,865.

*To all whom it may concern:*

Be it known that I, WOLFE COHEN, a citizen of the United States, residing at Revere, in the county of Suffolk and State of Massachusetts, have invented certain new and useful Improvements in Coin-Controlled Dispensing Apparatus, of which the following is a specification.

This invention relates to dispensing apparatus, and the primary object of the invention is to provide an improved "self service" ice cream dispensing machine, which is so constructed, as to deliver a predetermined amount of cream, upon the depositing of a coin of a predetermined value, consequently eliminating the services of a clerk for dispensing the cream, the machine only requiring the services of an attendant for filling the machine with the cream, and for packing the machine with ice.

Other objects of the invention are,—first, to provide an ice cream dispensing machine having a novel means for conveying the ice cream to be dispensed through a novelly constructed container having compartments for receiving ice, whereby the cream will be kept in a firm and solidified condition; second, a novel means for delivering one portion of the cream at a time to the delivery door; and third, a novel means for operating the delivery door in conjunction with the delivery mechanism, whereby the same will be operated synchronously.

A further object of the invention is to provide an ice cream dispensing machine, in which a maximum number of portions of ice cream is permitted to be contained in a machine occupying a minimum amount of space, said machine embodying a pair of angularly related conveyor belts, the belts having a novel means for permitting the portions of cream to be delivered from one belt to the other and from the final belt to the dispensing shelf.

A still further object of the invention is to provide a novel ice cream dispensing machine, which can be readily loaded with the ice cream in a convenient and expeditious manner.

With these and other objects in view, the invention consists in the novel construction, arrangement and formation of parts, as will be hereinafter more specifically described, claimed and illustrated in the accompanying drawings, forming a part of this specification, in which:

Figure 6 is a fragmentary plan view of the tongs for facilitating the loading of the machine with the ice cream, the handles of the tongs in this view being shown in section.

Figure 1:
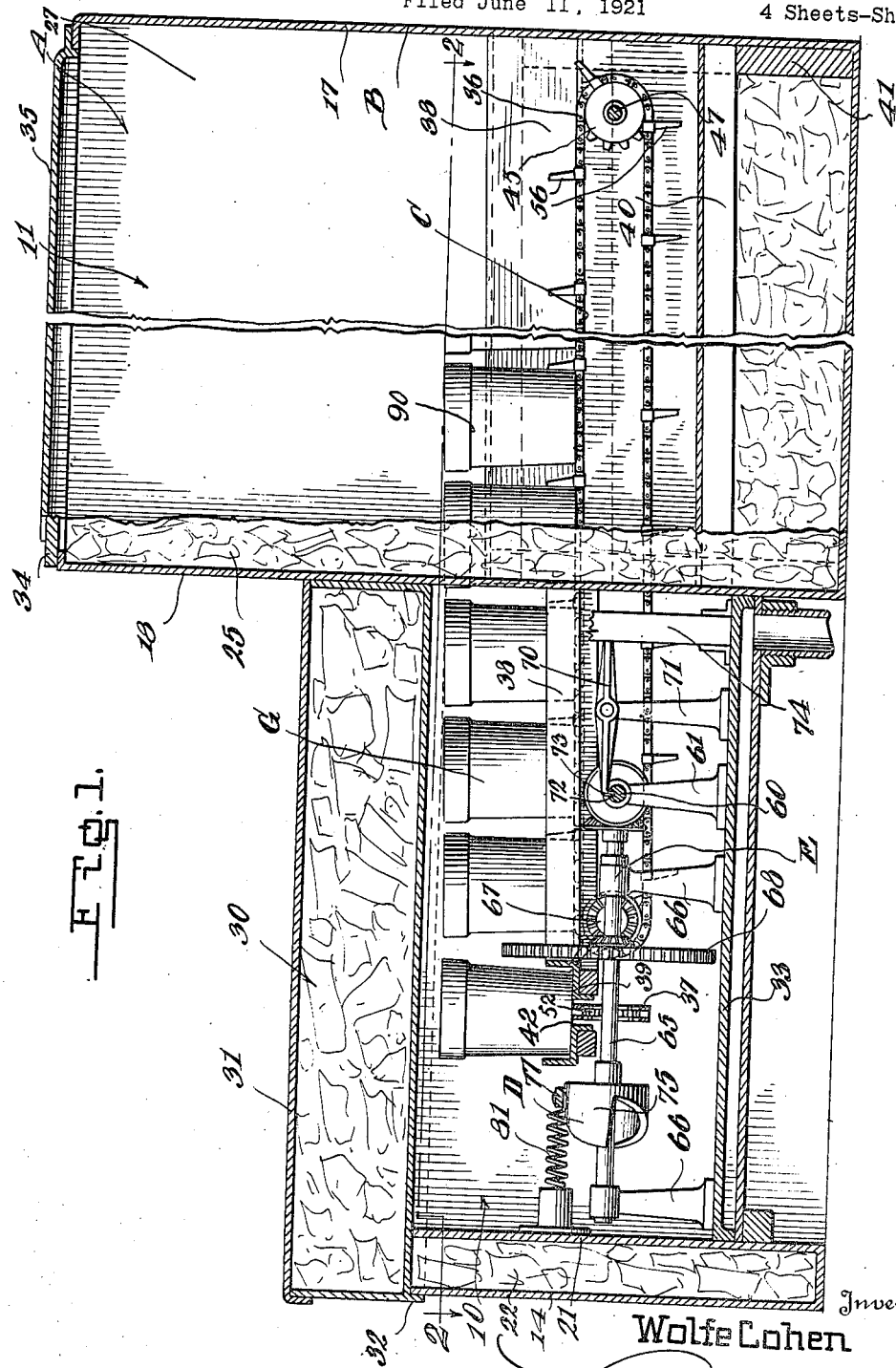
Figure 1 is a vertical longitudinal section through the improved dispensing machine taken on the line 1—1 of Figure 2.
Figure 2:
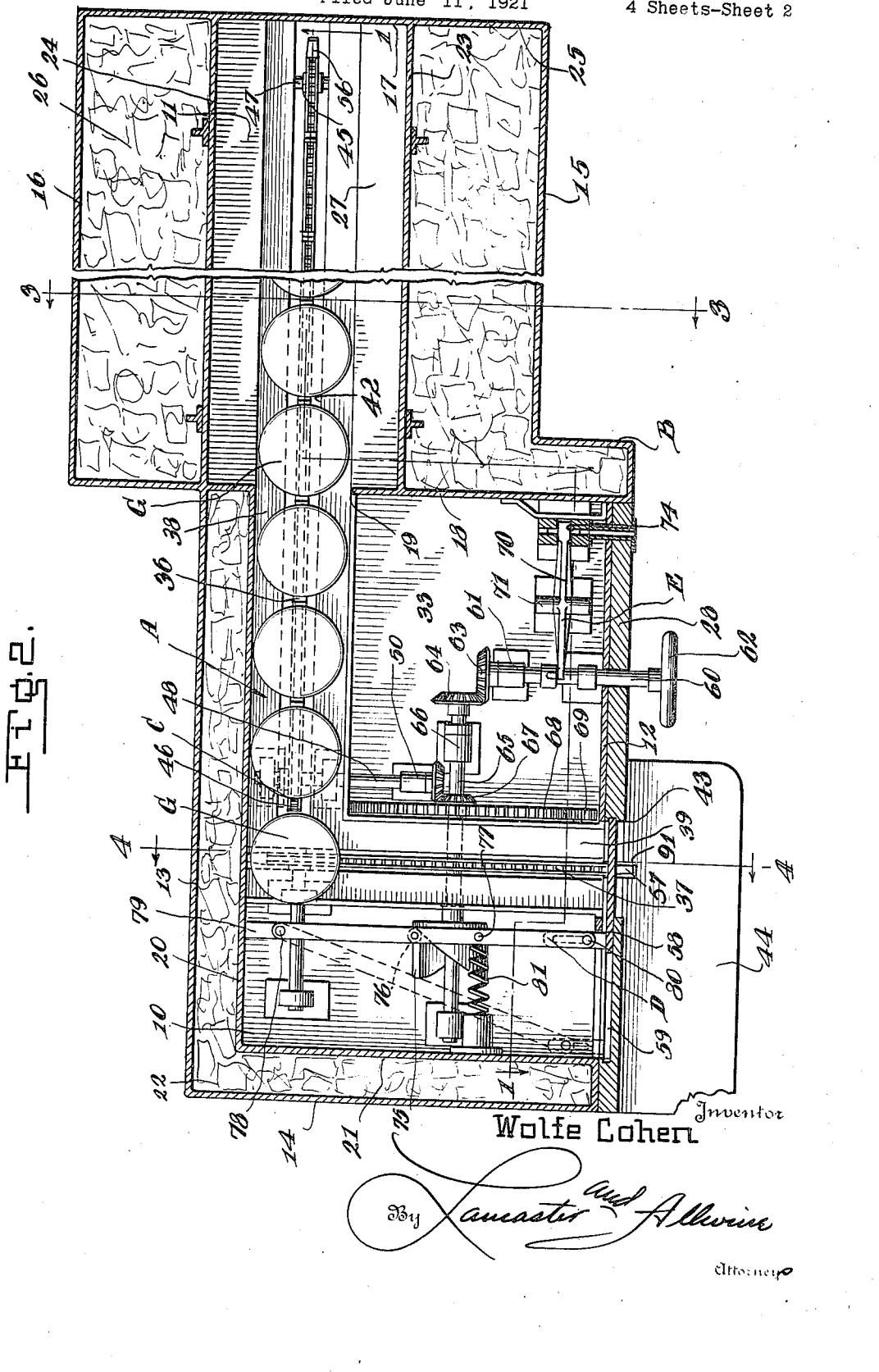
Figure 2 is a horizontal longitudinal section through the machine taken on the line 2—2 of Figure 1.

Referring to the drawings in detail, wherein similar reference characters designate corresponding parts throughout the several views, the letter A indicates the improved ice cream dispensing machine which includes the casing B; the delivery mechanism C; D, the delivery door mechanism; E, the means for controlling the operation of the delivery mechanism; and F, the tongs utilized for facilitating the loading of the machine with the ice cream to be dispensed.

The casing B is of novel construction, and can be built of any desired material, but it is preferred that the same be constructed of metal, and if so desired, the outer walls thereof may be suitably enamelled or made of porcelain, so as to present a neat and attractive appearance to the eye.

The container or casing B is preferably double walled, so as to provide ice compartments, as can be readily seen from the drawings. The casing B includes the forward section 10, and the laterally offset rear section 11. The section 10 includes the front wall 12, the rear wall 13, and the end wall 14. The section 11 includes the front wall 15, the rear wall 16, the end wall 17, and these sections are connected together by means of a partition wall 18, which is provided with an opening 19 through which the ice cream containers G are adapted to pass.

The section 10 is provided with the inner rear wall 20 and the inner side wall 21, which defines the ice compartments 22, while the section 11 is provided with a front and rear inclined walls 23 and 24, which define the ice compartments 25 and 26 and the central way 27. If so desired, the front wall 12 of the section 10 can have a marble slab 28 secured to the outer face thereof, so as to further add to the appearance thereof. The entire section 10 is adapted to be covered by a removable pan 30, which is adapted to contain ice or the like, and this pan 30 is provided with a removable cover 31, so as to facilitate the filling thereof with ice. It is desirable that the outer edge of the pan be provided with a depending flange 32, so as to permit a tight fit to be had between the pan and the section 10. This provides an ice chamber around the section 10, with the exception of the bottom and front walls thereof, and it is preferred that the bottom wall be formed of a pair of spaced plates 33, so as to form a dead air space therebetween. When it is desired to fill the ice chamber 21 with ice, it can be seen that it is merely necessary to remove the pan 30. The removal of this pan 30 also permits instant access to be had to the interior of the machine, when it is desired to make repairs to the operating mechanism thereof. The upper end of the section 11 may be provided with suitable removable covers 34 for the ice compartments 25 and 26, and with suitable covers 35 for the central compartment 27. The whole casing B is adapted to be provided with a suitable base, (not shown), so as to space the same from the ground.

Figure 3:
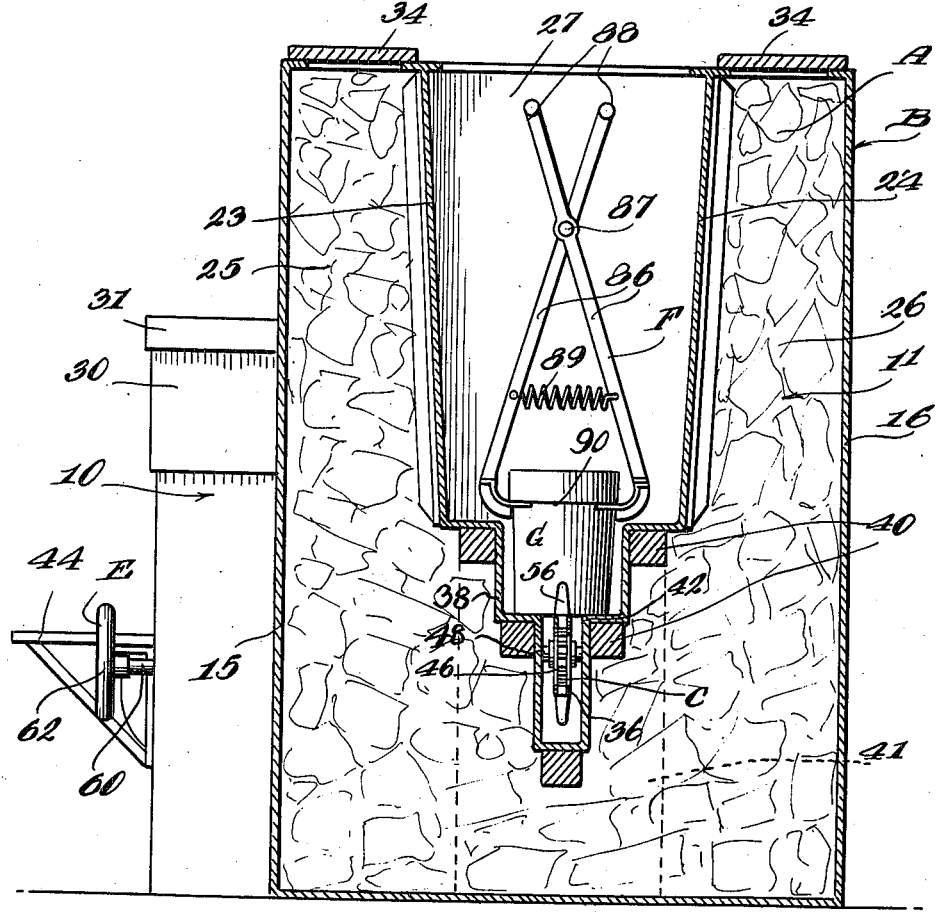
Figure 3 is a vertical transverse section through the improved machine taken on the line 3—3 of Figure 2 showing the novel form of tongs utilized for placing the ice cream in the machine.
Figure 4:
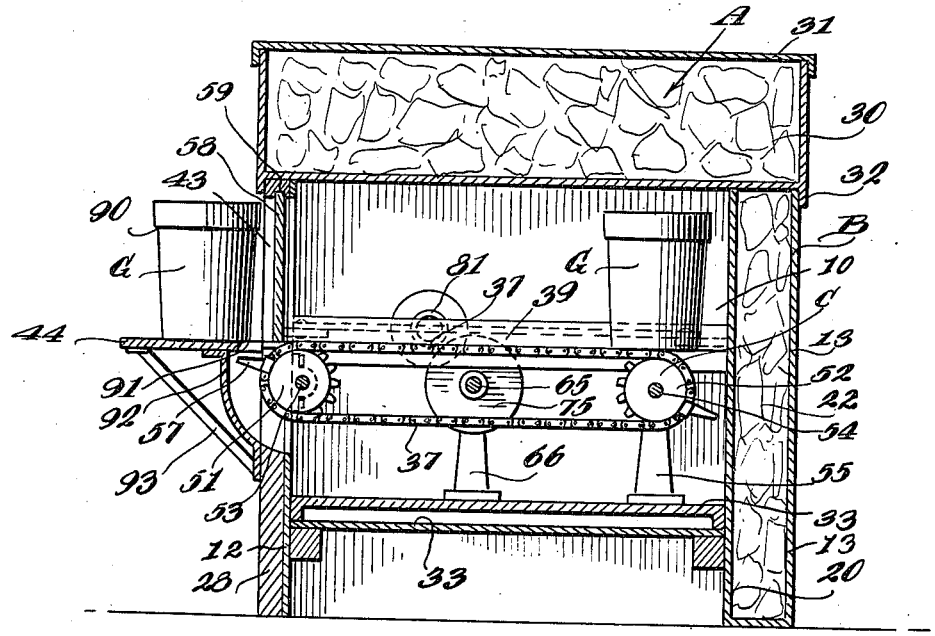
Figure 4 is a vertical transverse section taken on the line 4—4 of Figure 2.
Figure 5:
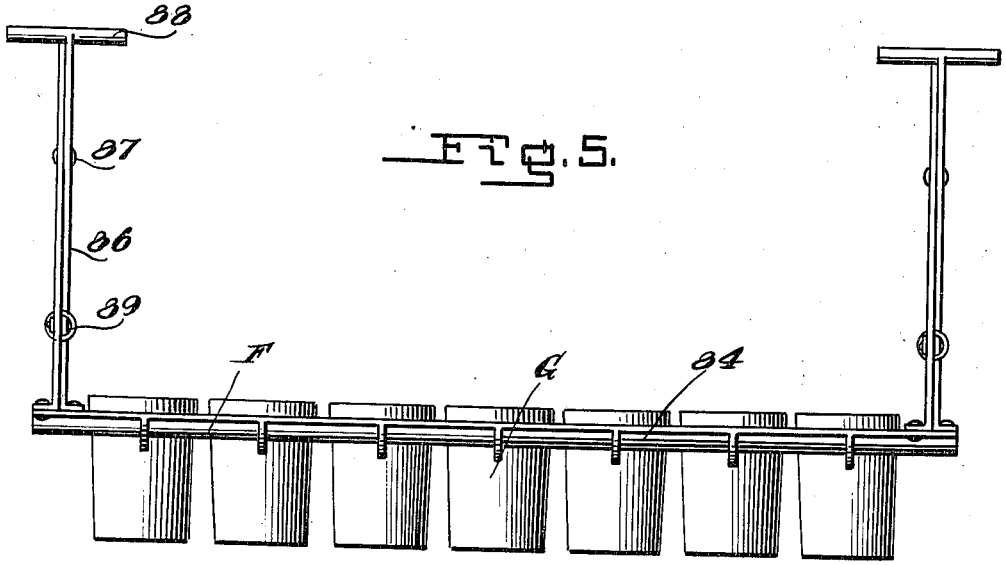
Figure 5 is a detail side elevation of the tongs utilized for facilitating the loading of the machine with the ice cream.

The delivery mechanism C comprises a pair of conveyor belts 36 and 37, and these belts, as shown, are arranged at right angles to each other, and operate in suitable troughs 38 and 39. The troughs 38 and 39 are substantially U-shaped in cross section, as clearly shown in Figures 1 and 3, and the same are held in place by means of suitable beams or supporting strips 40. These beams or strips 40 can be in turn held in place, by means of suitable supporting posts 41. The lower walls of the troughs 38 and 39 are provided with a central way 42, through which the conveyor chains 36 and 37 operate. It can be seen, by referring to Figures 1 and 3, that the upper runs of these chains are substantially flush with the upper surface of the bottom walls of the troughs 38 and 39. The trough 38 and the conveyor chain 36 extend longitudinally of the casing B and through the opening 19 and terminates flush with and at one end of the trough 39. The trough 39 and its conveyor chain 37 is arranged transversely of the section 10 of the casing B and extends to the front wall of the section which is provided with a delivery opening 43, through which the portions of cream to be dispensed are adapted to be pushed. A suitable shelf 44 is carried by the front wall directly below the opening, and in alignment with the upper run of the chain 37. The chain 36 is trained around suitable sprocket wheels 45 and 46, which are keyed to suitable shafts 47 and 48. The shaft 47 is formed relatively short and is mounted in suitable bearings carried by the trough 38, while the shaft 48 is formed relatively long and forms a part of the operating mechanism E which will also be hereinafter more fully described. This shaft 48 is mounted in suitable bearings carried by the trough and by the bearings 50 carried by the lower or bottom wall 33 of the section 10. The conveyor chain 37 is trained around suitable front and rear sprocket wheels 51 and 52 which are in turn keyed to suitable shafts 53 and 54. The shaft 54 is mounted in suitable bearings 55 carried by the lower wall 33, while the shaft 53 is mounted in suitable bearings carried by the inner surface of the front wall 12. This shaft also forms a portion of the operating mechanism E. The chain 36 is provided with outwardly extending spurs 56 arranged at suitable intervals and containers for the ice cream designated by the letter G are adapted to be positioned between these spurs. The chain 37 is provided with a pair of spurs 57 which are spaced substantially half a chain length from each other and are so arranged that one of the spurs will be in a position for pushing one of the ice cream containers on to the platform or shelf 44 while the other will be in position for engaging the ice cream container just pushed on to the rear end of the chain.

It can be seen that the chain 36 is adapted to have a plurality of containers G for the cream placed thereon and can be considered as the reservoir or supply chain, while the chain 37 is adapted to only have one container thereon at a time and can be considered as the delivery chain.

The opening 43 is adapted to be closed by a sliding door 58, which is mounted in suitable guide ways 59. The door is adapted to be operated by the mechanism D which is operatively connected to the operating mechanism E which will be now described.

The operating means E comprises an operating shaft 60 which is mounted in suitable bearings 61 carried by the lower wall 33. This shaft is provided with a hand wheel 62 so that the same can be manually operated, but if so desired, the shaft can be actuated by a suitable motor. This shaft protrudes through the front wall of the casing and is disposed adjacent to the shelf 44 and the delivery opening 43. The inner end of the shaft 60 is provided with a bevelled gear 63 which meshes with a bevelled gear 64 which is of the same ratio, and this bevelled gear 64 is keyed to a suitable longitudinally extending shaft 65. This shaft 65 is mounted in suitable bearings 66 carried by the lower wall 33. The shaft 65 is operatively connected to the shaft 48 of the conveyor chain mechanism C by means of bevelled gearing 67 of the same ratio. The shaft 65 also has keyed thereto a relatively large gear wheel 68 which meshes with a relatively small gear wheel 69 which is keyed to the forward shaft 53 of the conveyor chain 37. The gearing 67 and the gearing 69 is so arranged that upon one rotation of the shaft 60 the chain 36 will be only moved one step that is the distance between a pair of the spurs 56, so as to just push one of the containers G of the ice cream upon the chain 37, while the chain 37 will be moved a distance sufficient to move one of the containers on to the shelf 44.

The shaft 60 is adapted to be normally held against rotation by means of a lever 70 which is mounted intermediate its ends upon a suitable pin carried by a bearing 71 supported by the lower wall 33. The inner end of this lever is provided with a detent 72 which is adapted to fit in a notch 73 formed in the shaft 60. The opposite end of this lever is disposed in a coin chute 74, which can lead to the front wall or top of this casing. The lower end of the coin chute 74 can lead to a suitable coin drawer or the like. From this construction, it can be seen that when a coin is dropped in a chute, the same will hit the end of the lever 70 disposed in the chute and rock the same, thus lifting the detent 72 from out of the opening or notch 73 which will permit the shaft 60 to be turned.

The operating mechanism D for the sliding door 58 includes a cam wheel 75, which is keyed or otherwise secured to the longitudinally extending shaft 65. This cam wheel 75 is adapted to be engaged by a suitable roller 76 carried by the lever 77 intermediate its ends. This lever 77 has its rear end secured by means of a suitable pivot pin 78 to a support 79 carried by the rear wall of the casing. The forward end of this lever 77 is connected by means of a suitable slot and pin connection 80 with the door 58.

The lever 77 is also engaged intermediate its ends by means of a compression spring 81, which normally holds the door in a closed position. It can be seen that upon the rotation of the shaft 65 by the shaft 60, the cam wheel 75 through the medium of the roller 76 will operate the lever 77 and thus open the door 58 against the influence of the spring 81. As soon as the roller 76 has ridden past the high point of the cam wheel, the door will be returned to its normal closed position by means of the spring 81.

In order to facilitate the loading of the machine with the containers G of ice cream, the tongs F are provided. These tongs F include a pair of elongated jaws 83 and 84, the inner surfaces of which may be provided with companion notches 85 for engaging the outer surfaces of the container. The opposite ends of the jaws 83 have connected thereto suitable handle levers 86. These handle levers 86 are crossed and pivotally connected together as at 87. The upper ends of the levers may be provided with suitable hand grips 88. The jaws 83 and 84 are normally urged toward each other by means of contractile coil springs 89, which have their ends connected to the levers 86 inwardly of the pivot pins 87 thereof.

The containers G for the ice cream may be of any desired form and construction, and can be made of suitable waxed paper if so desired. As shown the containers are of cylindrical form and are provided with a strengthening rib 90 adjacent their upper ends under which the jaws 83 and 84 are adapted to engage.

In operation of the improved machine, a number of the containers G of ice cream are placed between the jaws 83 and 84 and the tongs are then lifted and inserted in the compartment 27. As soon as the containers G are in their correct position on the chain 36, the hand grips 88 are moved toward each other so as to release the containers. This operation is repeated until the chain is filled with the containers, after which the covers 35 are placed on the compartment 27. The covers 34 and the pan 30 can be removed and the machine packed with ice, after which the covers 34 and the pan 30 can be placed in position. As shown in the drawings the pan 30 is also filled with ice. After the machine has been loaded and packed with ice, the same is ready for use, and when it is desired to obtain a portion of the ice cream from the machine, a coin is introduced in the chute 74 which operates the lever 70, as heretobefore stated, and the shaft 60 is then turned. The turning of the shaft 60 operates the conveyor belts 36 and 37 synchronously and one of the containers will be moved off of the conveyor belt 36 onto the conveyor chain 37 and the container G previously positioned on the chain 37 will be delivered through the opening 43, the door 58 therefor having been opened by the cam and lever mechanisms 75 and 77 as hereinbefore described. Owing to the position of the chains 36 and 37 in relation to each other and the lugs 56 carried by the chain, it can be seen that the container can be readily pushed off of the chain 36 on to the chain 37, and that the container can be readily pushed off of the chain 37 on to the shelf 44. In order to facilitate the pushing of the container on to the shelf 44, a slot 91 is provided in the shelf 34, and it can be seen that the lugs 57 are adapted to ride through the slot. In order to prevent the entrance of warm air into the section 10 through the slot, a hood 92 is provided, which also forms a support for the shelf 44. It can be seen that after a container G has been delivered to the shelf 44, the lug 57 which has just pushed the container G on the shelf will lie in the slot and close the same, which will further prevent the entrance of warm air into the container. If so desired the shelf may be further supported by means of suitable brackets 93.

If desired, the chain 36 can also be inclined toward its forward end, so as to further facilitate the delivering of the containers onto the conveyor chain 37.

From the foregoing description, it can be seen that an exceptionally simple device has been provided for the dispensing of ice cream, which will effectively deliver one portion of the cream at a time upon depositing of a coin, in which the cream will be kept in a firm and solidified condition. It is of course, to be understood, that certain changes may be made in the invention provided the same do not depart from the spirit or scope of the claims, such as eliminating the conveyor chain 37 and delivering the containers directly from the conveyor chain 36 to a suitable door provided for that purpose.

If desirable a suitable counter mechanism can be operatively connected with the delivery mechanism C, so that the exact number of containers dispensed can be readily seen. This mechanism can also be so arranged that a suitable bell or other signal will be sounded when the dispensing machine is almost empty, so as to warn the attendant that the machine needs refilling.

I claim:

1. An ice cream dispensing machine comprising a casing having ice compartments therein, a longitudinally extending trough arranged in the casing intermediate the ice compartments, a delivery door in said casing, a trough arranged at right angles to the first trough and terminating at said door, right angularly related conveyor chains arranged in said troughs, and means for synchronously operating said chains.

2. In an ice cream dispensing machine, a casing having ice compartments therein and an open top, an ice pan arranged to fit over the open top having a removable cover, conveying mechanism arranged in the casing intermediate the ice compartments, a delivery door, and means for synchronously operating the delivery mechanism and the delivery door.

3. In an ice cream dispensing machine, a casing having ice compartments therein, a pair of angularly related ice cream receiving troughs, a pair of right angularly related conveyor chains arranged in said troughs, one of the chains being adapted to deliver the cream to be dispensed to the other chain, and means for operating one of the chains at a faster rate of speed than the other chain.

4. In an ice cream dispensing machine, a casing having ice compartments therein, an ice cream receiving trough arranged in the casing intermediate the ice compartments, a casing having a door opening, a sliding door for said opening, an operating shaft, a conveyor chain in said trough, and means operatively connecting the operating shaft with the conveyor chain; a lever pivotally secured at its inner end to the casing and pivotally and slidably secured to the door at its outer end, and a cam keyed to said operating shaft for operating said levers.

5. In an ice cream dispensing machine, a casing having a plurality of ice compartments therein, a trough arranged to receive the ice cream fitted in the casing between the ice compartments, and a right angularly related trough fitted in the casing between the ice compartments arranged to receive the ice cream from the first mentioned trough, right angularly related chains arranged in said troughs, the casing having a door opening therein in alignment with the last mentioned trough, a sliding door for said opening, an operating shaft, means for operating the first chain in the first mentioned trough from said shaft, means for operating the chain in the second mentioned trough from said shaft at a higher rate of speed than the first mentioned shaft, and means for operating the sliding door from said operating shaft.

6. In an ice cream dispensing machine, a casing having ice compartments therein, a longitudinally extending ice cream receiving trough fitted in the casing between the ice compartments, and a right angularly extending trough communicating with one end of the first mentioned trough fitted in the casing between the ice compartments, a longitudinally extending conveyor chain operating in the first mentioned trough, a transversely extending conveyor chain operating in the second mentioned trough, means for permitting the depositing of ice cream upon the first mentioned chain, guide lugs carried by the first mentioned chain arranged to support the ice cream to be dispensed upon the second mentioned shaft, a coin controlled operating shaft, and means operatively connecting the chains with said shaft whereby the same will be synchronously operated.

7. An ice cream dispensing machine comprising a casing having ice compartments therein, a longitudinally extending ice cream receiving trough arranged in the casing intermediate the ice compartments, a transversely extending trough communicating with one end of the longitudinally extending trough and arranged in the casing intermediate the ice compartments, the casing having a delivering opening therein communicating with the outer end of the transversely extending trough, and a shelf in front of said opening having a slot therein, conveyor chains arranged to travel in said troughs, a coin controlled operating shaft, a sliding door for said opening, an operating mechanism for the door, means operatively connecting the conveyor chain with the door operating mechanism and with said coin controlled operating shaft, pusher lugs formed on said chains, the lugs on one of the chains being adapted to travel in said slot formed in the shelf.

8. An ice cream dispensing machine comprising a casing having ice compartments therein, a longitudinally extending ice cream receiving trough arranged in the casing between the ice compartments, a transversely extending trough arranged in the casing between the ice compartments, a longitudinally extending conveyor chain operating in the first mentioned trough, a transversely extending conveyor chain operating in the second mentioned trough, the casing having a door opening therein in alignment with the second mentioned trough, a sliding door arranged to normally close said opening, a lever, means pivotally securing the lever at one end, means connecting the lever with said door, an operating shaft, a counter shaft operatively connected with the operating shaft, means operatively connecting the counter shaft with the conveyor chains, a cam wheel connected to said counter shaft, a roller secured to the lever intermediate its ends, and spring means engaging said lever for normally holding the door in a closed position and the roller in engagement with said cam wheel.

WOLFE COHEN.